US012502889B2

(12) United States Patent
Johnson

(10) Patent No.: US 12,502,889 B2
(45) Date of Patent: Dec. 23, 2025

(54) LIQUID EJECTION HEAD AND METHOD OF INSPECTING THE LIQUID EJECTION HEAD

(71) Applicant: CANON KABUSHIKI KAISHA, Tokyo (JP)

(72) Inventor: Michiko Johnson, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 18/481,165

(22) Filed: Oct. 4, 2023

(65) Prior Publication Data

US 2024/0116292 A1 Apr. 11, 2024

(30) Foreign Application Priority Data

Oct. 7, 2022 (JP) ................................ 2022-162136

(51) Int. Cl.
*B41J 2/14* (2006.01)

(52) U.S. Cl.
CPC ....... *B41J 2/14233* (2013.01); *B41J 2/14072* (2013.01); *B41J 2/14201* (2013.01); *B41J 2002/14241* (2013.01)

(58) Field of Classification Search
CPC ................ B41J 2/14072; B41J 2/14201; B41J 2002/14241
See application file for complete search history.

(56) References Cited

U.S. PATENT DOCUMENTS

2005/0162481 A1* 7/2005 Furuhata .............. B41J 2/14233 347/58

FOREIGN PATENT DOCUMENTS

JP 2004034293 A * 2/2004 .............. B41J 2/045
JP 2021171971 A 11/2021

* cited by examiner

*Primary Examiner* — Geoffrey S Mruk
(74) *Attorney, Agent, or Firm* — Canon U.S.A., Inc. IP Division

(57) ABSTRACT

A liquid ejection head includes a first substrate having a recessed portion, and a second substrate. An energy generating element that generates energy to eject liquid is in the recessed portion and is placed on a surface of the second substrate that faces the recessed portion. An electrode electrically connected to the energy generating element is formed in an end portion of the energy generating element. Among recessed portion side surfaces, a side surface of the recessed portion close to the electrode is inclined with respect to a joint surface between the first substrate and the second substrate. The end portion of the energy generating element close to the electrode, an end portion of the joint surface close to the electrode, and an end portion of a bottom surface of the recessed portion close to the electrode are located in sequence from a middle of the energy generating element.

6 Claims, 11 Drawing Sheets

100

LIQUID EJECTION HEAD AND METHOD OF INSPECTING THE LIQUID EJECTION HEAD

BACKGROUND

Field

The present disclosure relates to a liquid ejection head and a method of inspecting the liquid ejection head.

Description of the Related Art

Recording devices that perform recording by ejecting a liquid such as ink are known. Such a recording device has a liquid ejection head, and the liquid is ejected through the ejection port after receiving energy from an energy generating element provided in the liquid ejection head. An example of the energy generating element is a piezoelectric element. A system that pressurizes liquid by using a piezoelectric element is often referred to as a piezo system.

Japanese Patent Laid-Open No. 2021-171971 discloses a piezo-system liquid ejection head. FIG. 4 schematically illustrates a sectional view of the liquid ejection head disclosed in Japanese Patent Laid-Open No. 2021-171971. As illustrated in FIG. 4, the liquid ejection head described in Japanese Patent Laid-Open No. 2021-171971 is formed by a plurality of substrates being joined together. In the liquid ejection head as described above, visible light inspection of the state of electrical connections and the like in an enclosed cavity (also simply referred to as an enclosed space or a recessed portion) 12 in which the piezoelectric element is housed may not be performed after the substrates are joined together. Accordingly, a near-infrared light microscope, which performs inspection by irradiation with near-infrared light, is used.

As illustrated in FIG. 4, when the enclosed cavity 12 has a shape that widens toward the ejection port, that is, a folding-fan shape, near-infrared light for the inspection scatters in the folding-fan portion. As a result, the reflected near-infrared light does not sufficiently reach the near-infrared light microscope, and accordingly, there is an issue in that proper near-infrared light inspection cannot be performed.

SUMMARY

The present disclosure provides a liquid ejection head that can appropriately be used to inspect inside of an enclosed cavity (recessed portion) in a near-infrared light inspection.

According to an aspect of the present disclosure, a liquid ejection head includes a first substrate having a recessed portion, and a second substrate joined with the first substrate, wherein an energy generating element configured to generate energy for ejecting liquid is housed in the recessed portion of the first substrate and is placed on a surface of the second substrate that faces the recessed portion, wherein an electrode that is electrically connected to the energy generating element is formed in an end portion of the energy generating element, wherein, among side surfaces of the recessed portion, a side surface of the recessed portion close to the electrode is inclined with respect to a joint surface between the first substrate and the second substrate, and wherein the end portion of the energy generating element close to the electrode, an end portion of the joint surface close to the electrode, and an end portion of a bottom surface of the recessed portion close to the electrode are located in sequence from a middle of the energy generating element.

Further features of the present disclosure will become apparent from the following description of exemplary embodiments with reference to the attached drawings.

DESCRIPTION OF THE EMBODIMENTS

Embodiments of the present disclosure will be described in detail below. It should be noted that the embodiments described below are examples for sufficiently describing the present disclosure and do not particularly limit the scope of the present disclosure.

CONVENTIONAL EXAMPLES

Figure 1:
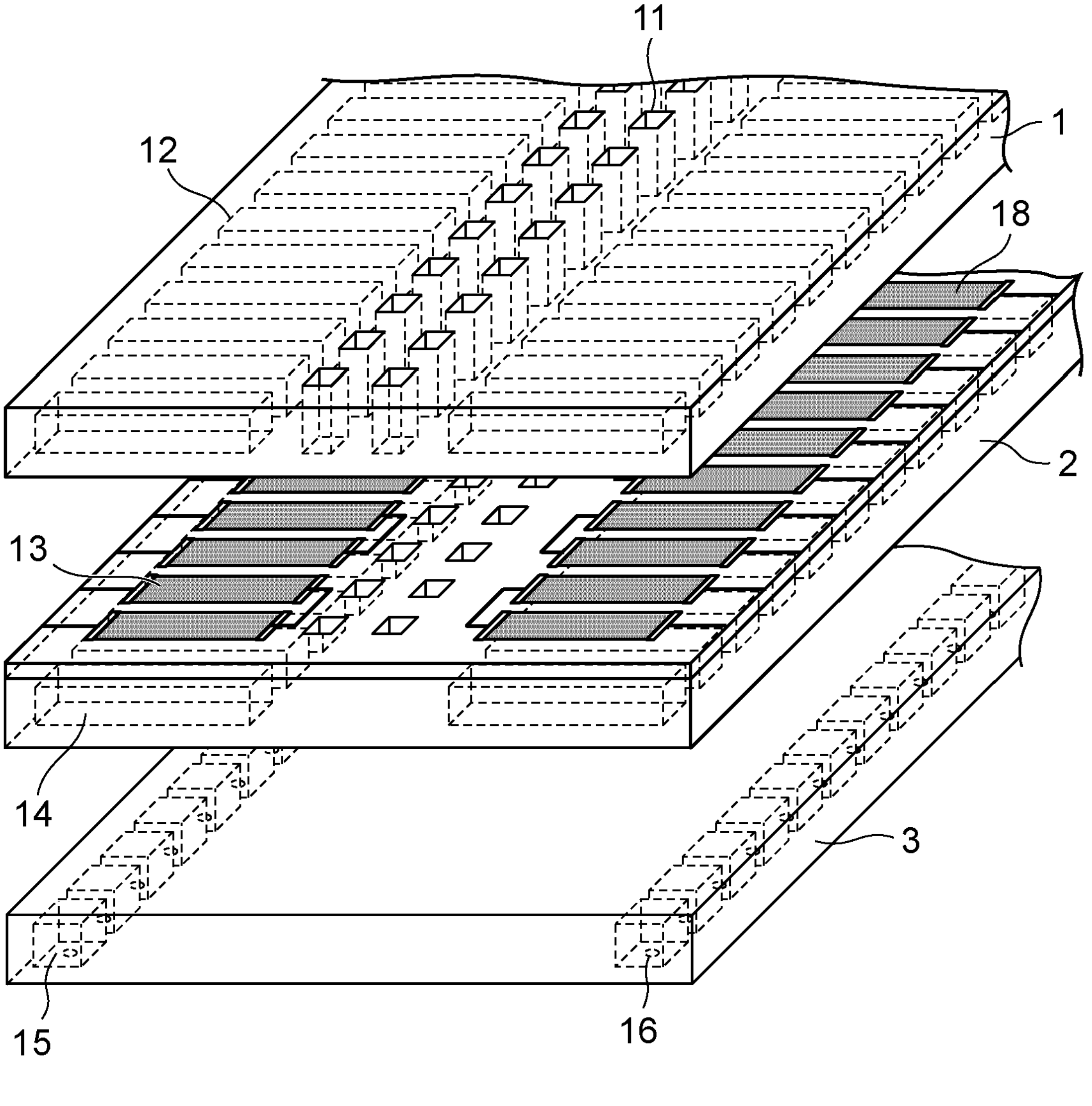
FIG. 1 is an exploded perspective view of a liquid ejection head.
Figure 2:
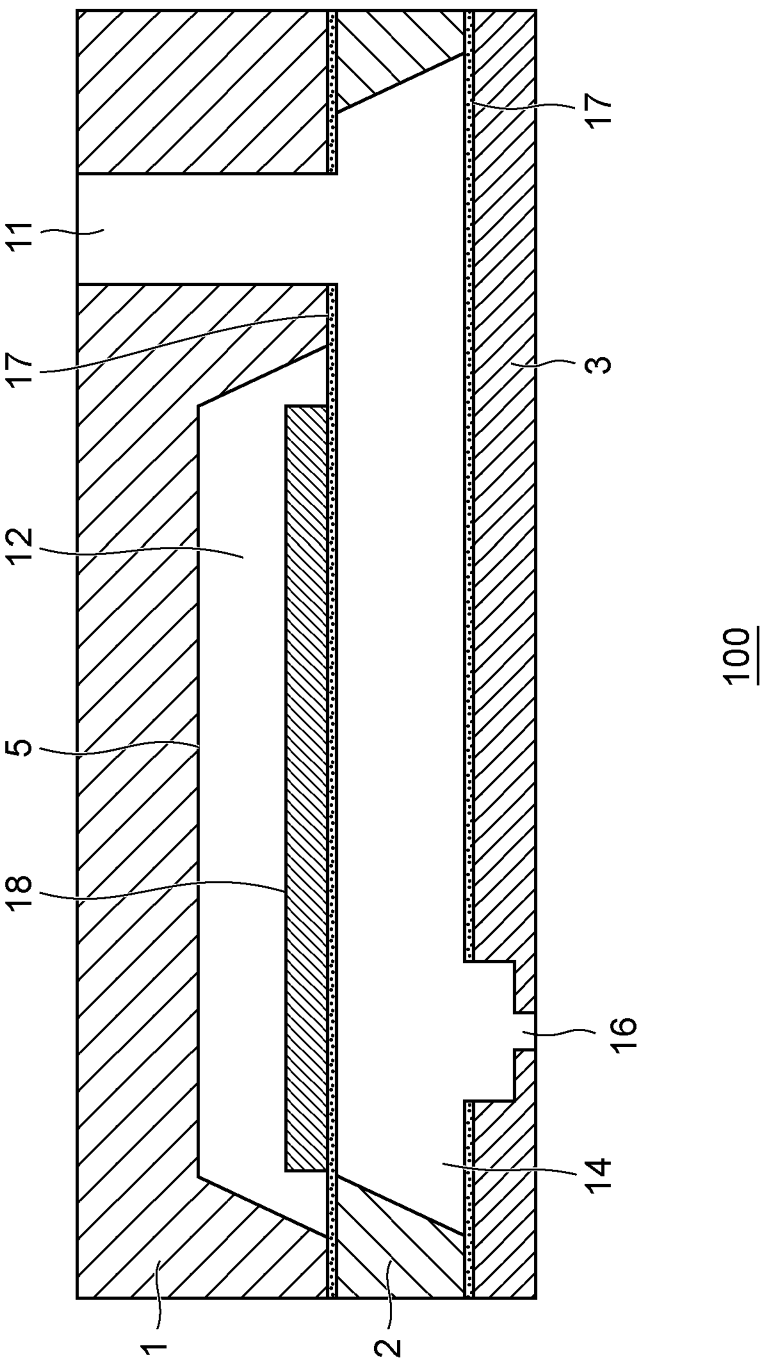
FIG. 2 is a sectional view of the liquid ejection head.
Figure 3:
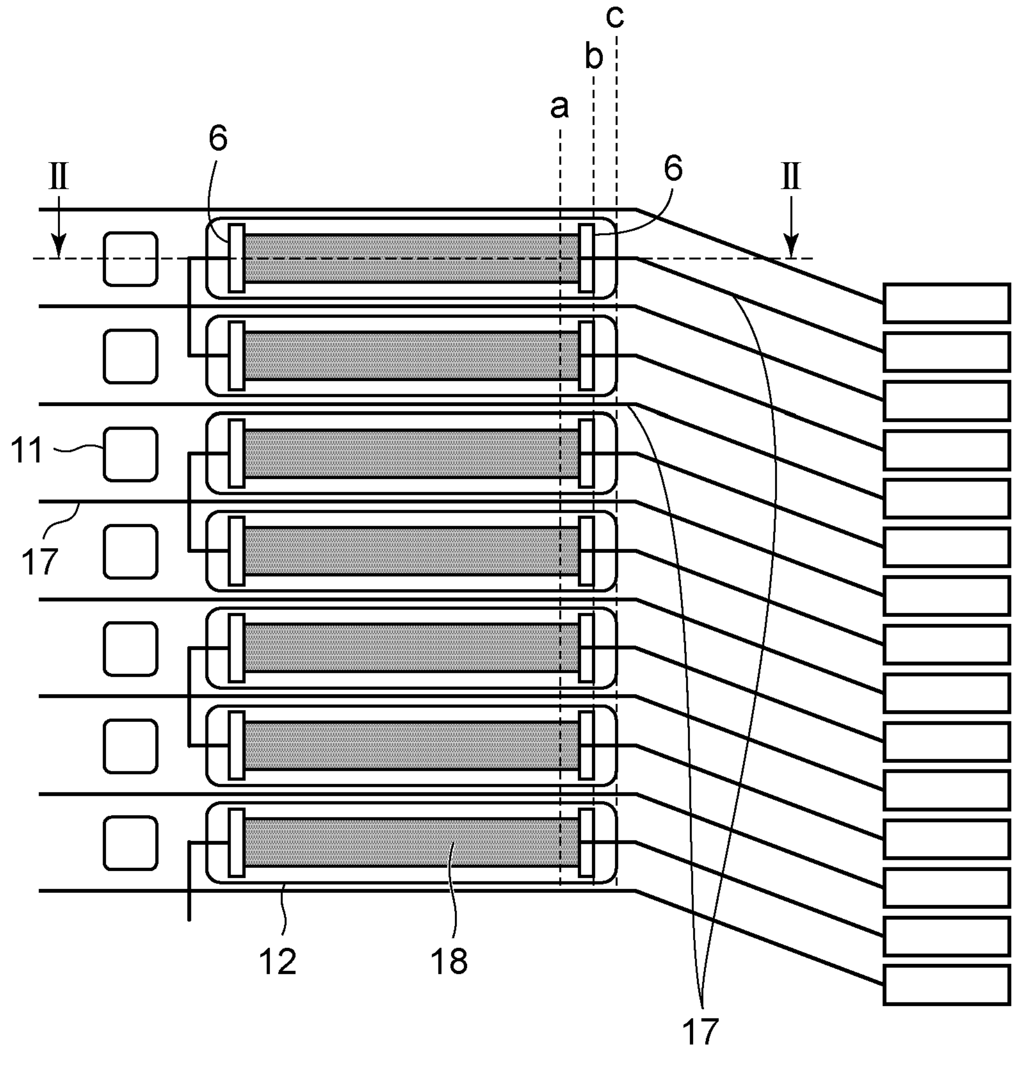
FIG. 3 is a plan view of the vicinity of an energy generating element.

FIG. 1 is an exploded perspective view of a liquid ejection head 100. FIG. 2 is a sectional view taken along line II-II in FIG. 3. FIG. 3 is a top view of the structure of the vicinity of an energy generating element 18. As illustrated in FIGS. 1 and 2, the liquid ejection head 100 includes a first substrate 1, a second substrate 2, and a third flow path substrate 3. The first substrate 1, the second substrate 2, and the third flow path substrate 3 are plate-like members. A plurality of inlet ports 11 are formed in a first surface of the first substrate 1, and recessed portions 12 are formed in a second surface facing away from the first surface. A plurality of energy generating elements 18 and a plurality of diaphragms 13 are formed on a first surface of the second substrate 2, and pressure chambers 14 are formed in a second surface facing away from the first surface. A plurality of flow paths 15 are formed in a first surface of the third flow path substrate 3, and ejection ports 16 are formed in a second surface so as to face the flow path 15 in the first surface.

The liquid ejection head 100 is formed by the first substrate 1 and the second substrate 2 being joined to each other with an adhesive agent and the second substrate 2 and the third flow path substrate 3 being joined to each other with an adhesive agent. The joint region is referred to as a joint surface 17. The individual components including the first substrate 1, the second substrate 2, and the third flow path substrate 3 are formed by single crystal substrates of, for example, silicon (Si) by being machined by a semiconductor manufacturing technique, such as etching.

As illustrated in FIG. 1, the plurality of ejection ports 16 arranged in the longitudinal direction are formed in the third flow path substrate 3, and the ejection ports 16 are through-holes through which ink passes. The first substrate 1 is a plate-like member that forms an ink flow path, and the inlet ports 11 are formed in the first substrate 1 as illustrated in FIG. 2. The inlet ports 11 are through-holes formed continuously with the plurality of the ejection ports 16 of the flow path substrate 3 via the pressure chambers 14 formed in the second substrate 2.

As illustrated in FIG. 2, the recessed portions 12 of the first substrate 1 are formed at positions facing the energy generating elements 18 of the second substrate 2, and the recessed portions 12 fully house the energy generating elements 18 by the outside portions in contact with the second substrate 2 being joined via the joint surface 17.

As illustrated in FIG. 3, the energy generating elements 18 have electrodes for applying a voltage, and the electrodes up to the electrode ends are housed in the recessed portions. The wiring portions connected to the electrode ends are disposed under the joint surface between the first substrate 1 and the second substrate 2. At this time, it is necessary to confirm that the energy generating elements 18 have been successfully housed in the recessed portions 12. However, the conventional recessed portion illustrated in FIG. 2 has side surfaces inclined such that the opening decreases toward the bottom surface 5 of the recessed portion having been formed, from a surface of the first substrate 1 joined to the second substrate 2.

Inspection using a near-infrared light microscope is generally performed to inspect, for example, the inside of silicon (Si) having being joined, but if there is an inclined portion with respect to the direction of irradiation of near-infrared light, an image cannot be obtained because the light scatters, and accordingly, the entire energy generating element 18 cannot be inspected.

Figure 4:
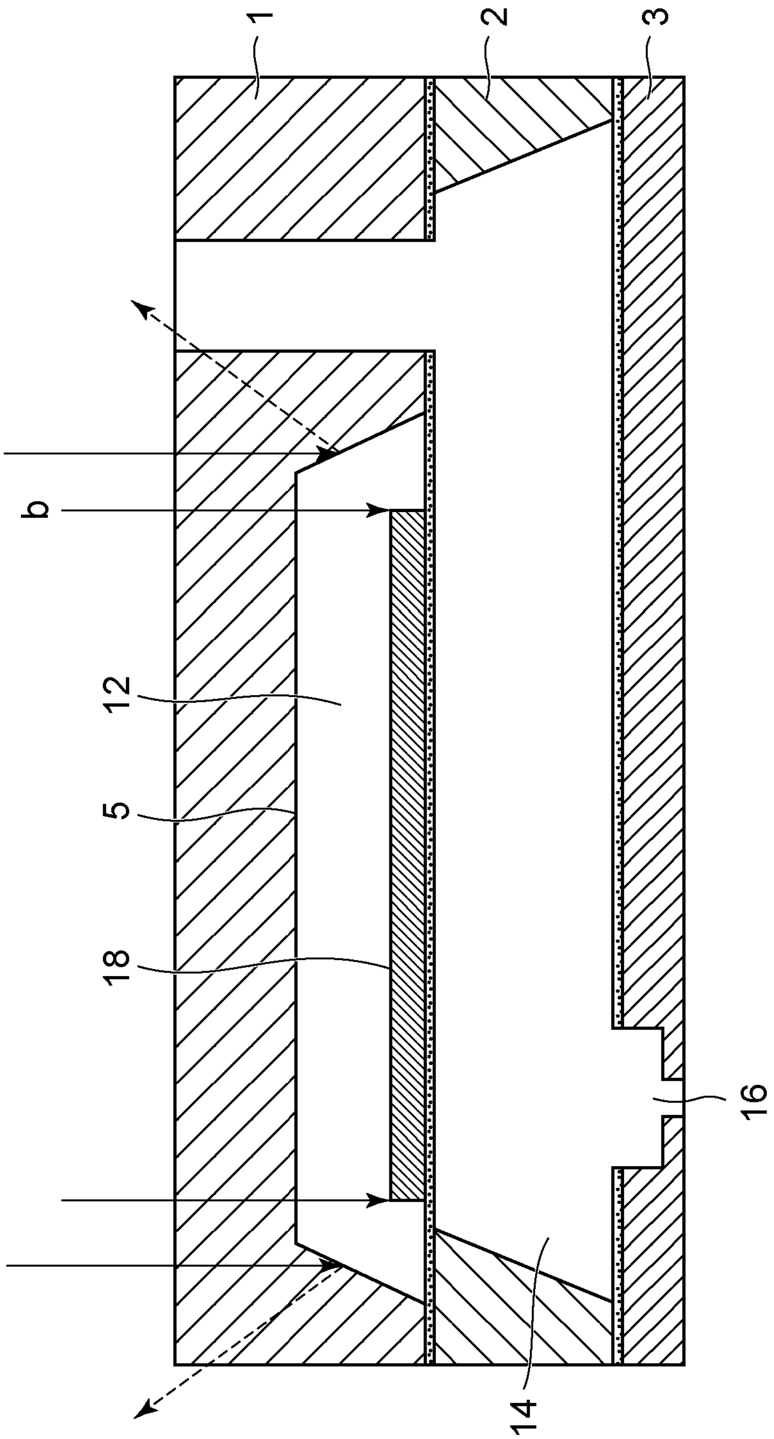
FIG. 4 is sectional view of a conventional liquid ejection head.

FIG. 4 illustrates the scattering of light with respect to the direction of irradiation of near-infrared light in the structure in which the side surface of the recessed portion of the conventional liquid ejection head is inclined. In FIG. 4, electrodes 6 are not illustrated. In the case of observation from the upper surface of the first substrate by using a near-infrared light microscope, since the portion from, for example, the end portion of the bottom surface to line b illustrated in FIG. 3 is shaded due to the shape of the side edge portion of the bottom surface of the recessed portion, the wiring portion connected to the energy generating element and the like cannot be optically inspected.

Figure 5:
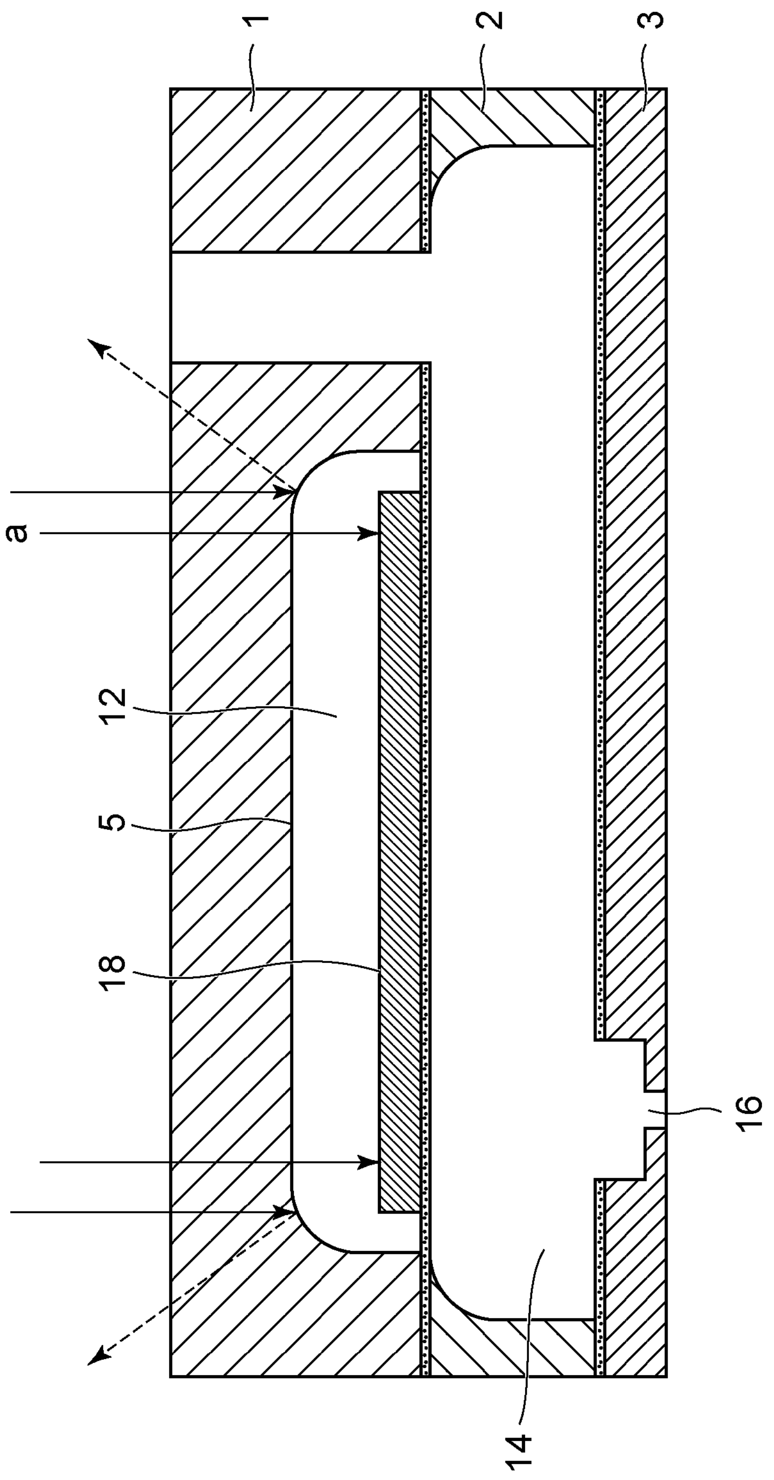
FIG. 5 is a sectional view of a conventional liquid ejection head.

In addition, in FIG. 5, even when the side surface of the recessed portion of the conventional liquid ejection head is orthogonal to the second substrate 2, the near-infrared illuminating light is scattered on a curved surface that is present near the bottom surface. In FIG. 5, the electrodes 6 are not illustrated. In the case of observation from the upper surface of the first substrate by using a near-infrared light microscope, since the portion from, for example, the end portion of the bottom surface to line a illustrated in FIG. 3 is shaded due to the shape of the side edge portion of the bottom surface of the recessed portion, the end portion of the energy generating element, the wiring portion, and the connecting portion thereof cannot be optically inspected.

First Embodiment

Figure 6:
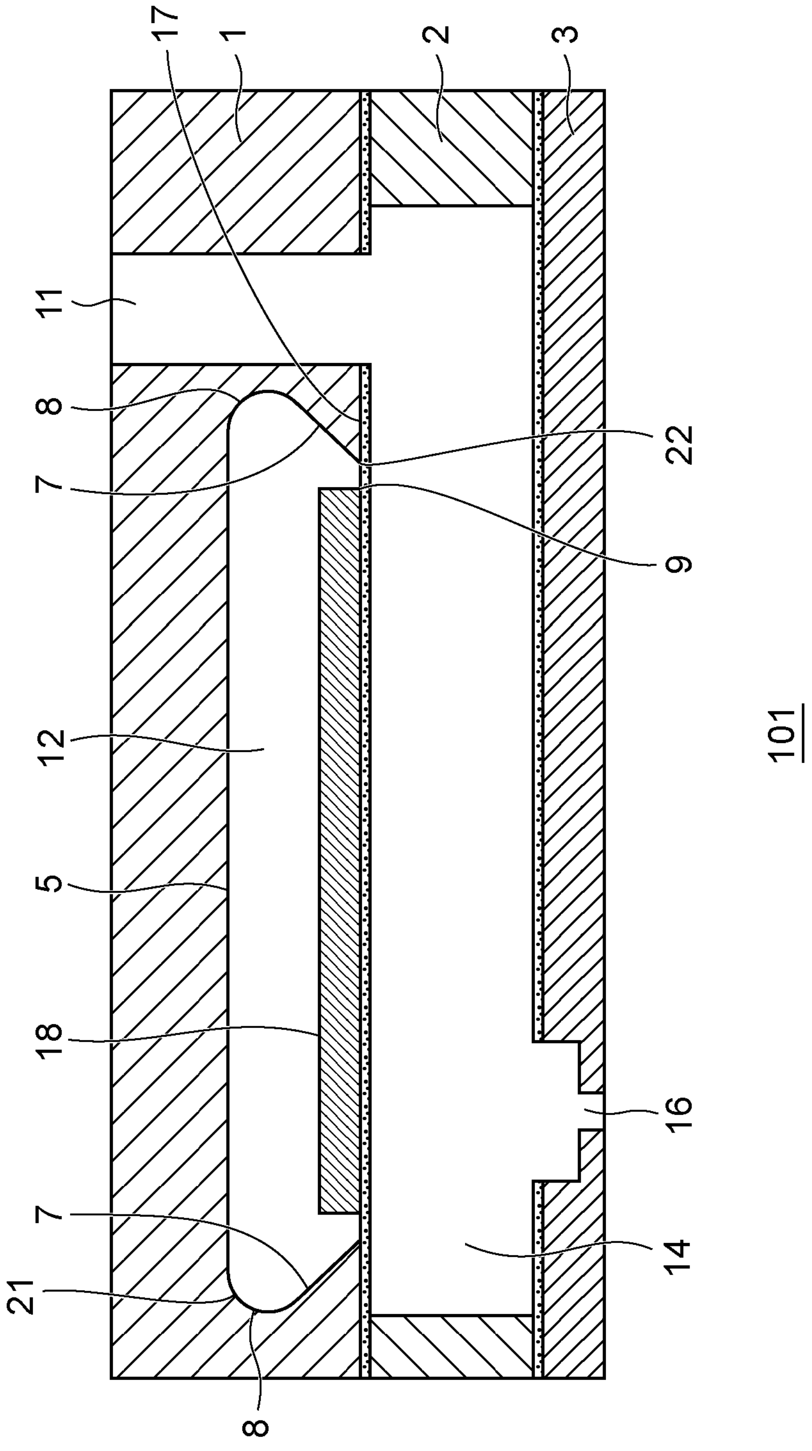
FIG. 6 is a sectional view of a liquid ejection head according to a first embodiment.

FIG. 6 is a sectional view of a liquid ejection head according to a first embodiment. In FIG. 6, the electrodes 6 are not illustrated. As illustrated in FIG. 6, a liquid ejection head 101 according to the embodiment includes the first substrate 1, the second substrate 2, and the third flow path substrate 3, which are plate-like members. A plurality of inlet ports 11 are formed in the first surface of the first substrate 1, and the recessed portions 12 are formed in the second surface facing away from the first surface.

A plurality of energy generating elements 18 are disposed on the first surface of the second substrate 2, and pressure chambers 14 are formed in the second surface facing away from the first surface. The energy generating element may be a heating element or a piezoelectric element. A plurality of flow paths 15 and a plurality of ejection ports 16 are formed in the third flow path substrate 3. In the liquid ejection head 101, the joint surfaces 17 are formed by the first substrate 1 and the second substrate 2 being joined to each other and the second substrate 2 and the third flow path substrate being joined to each other with, for example, an adhesive agent.

As illustrated in FIG. 6, the recessed portion 12 has side surfaces inclined such that the opening increases toward the bottom surface 5 of the recessed portion having been formed, from a surface of the first substrate 1 joined to the second substrate 2. The bottom surface 5 of the recessed portion of the first substrate 1 can be considered to be optically flat because less light scatters thereon. The bottom surface 5 of the recessed portion is connected to a curved surface 8 of the recessed portion 12 at the end portion 21 of the bottom surface. The outline of the opening of the first substrate 1 close to the joint surface with respect to the second substrate 2 is represented by an end portion 22 of the joint surface, and the end portion 22 of the joint surface is closer to the energy generating element 18 than is the end portion 21 of the bottom surface.

Figure 7:
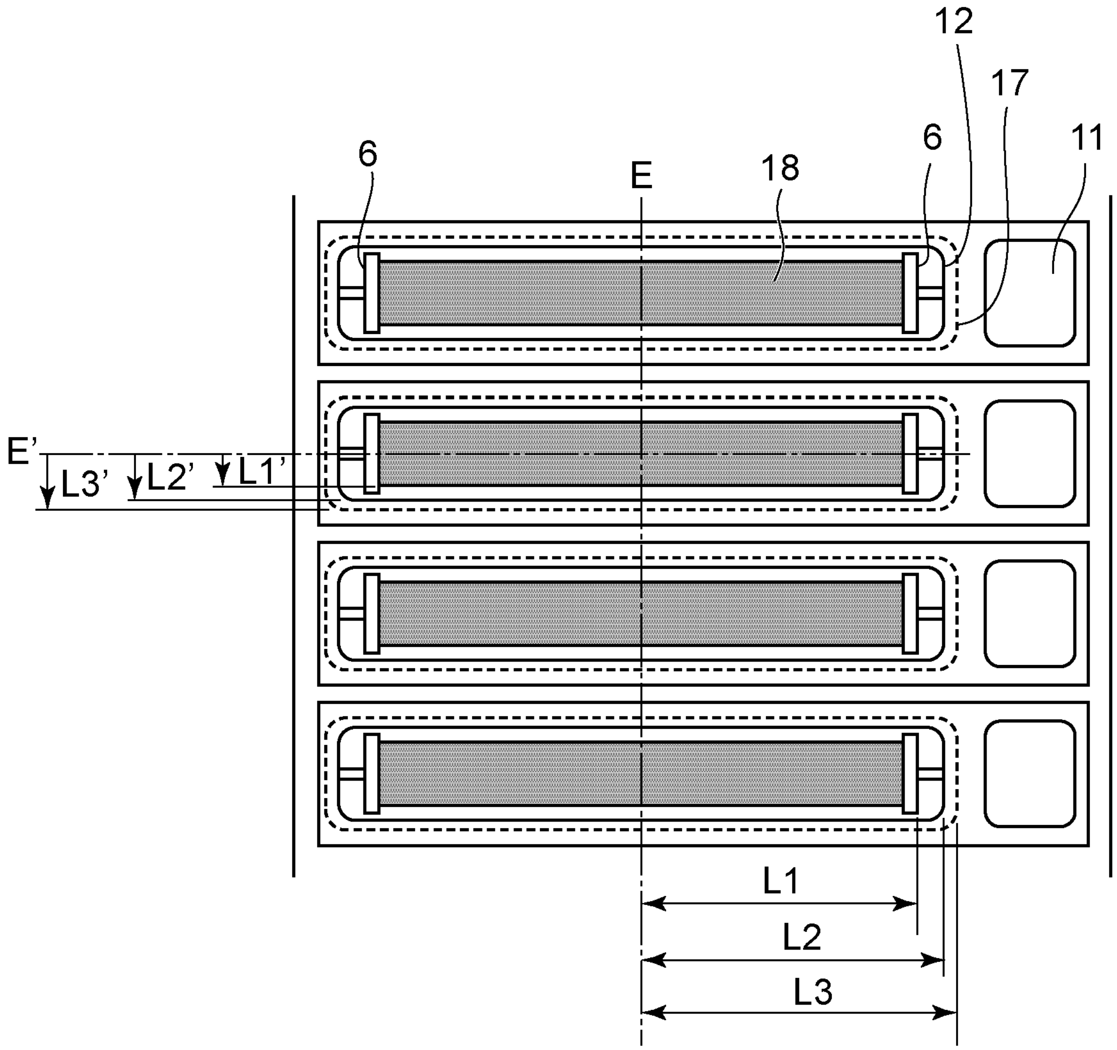
FIG. 7 is a plan view of the vicinity of an energy generating element.
Figure 8:
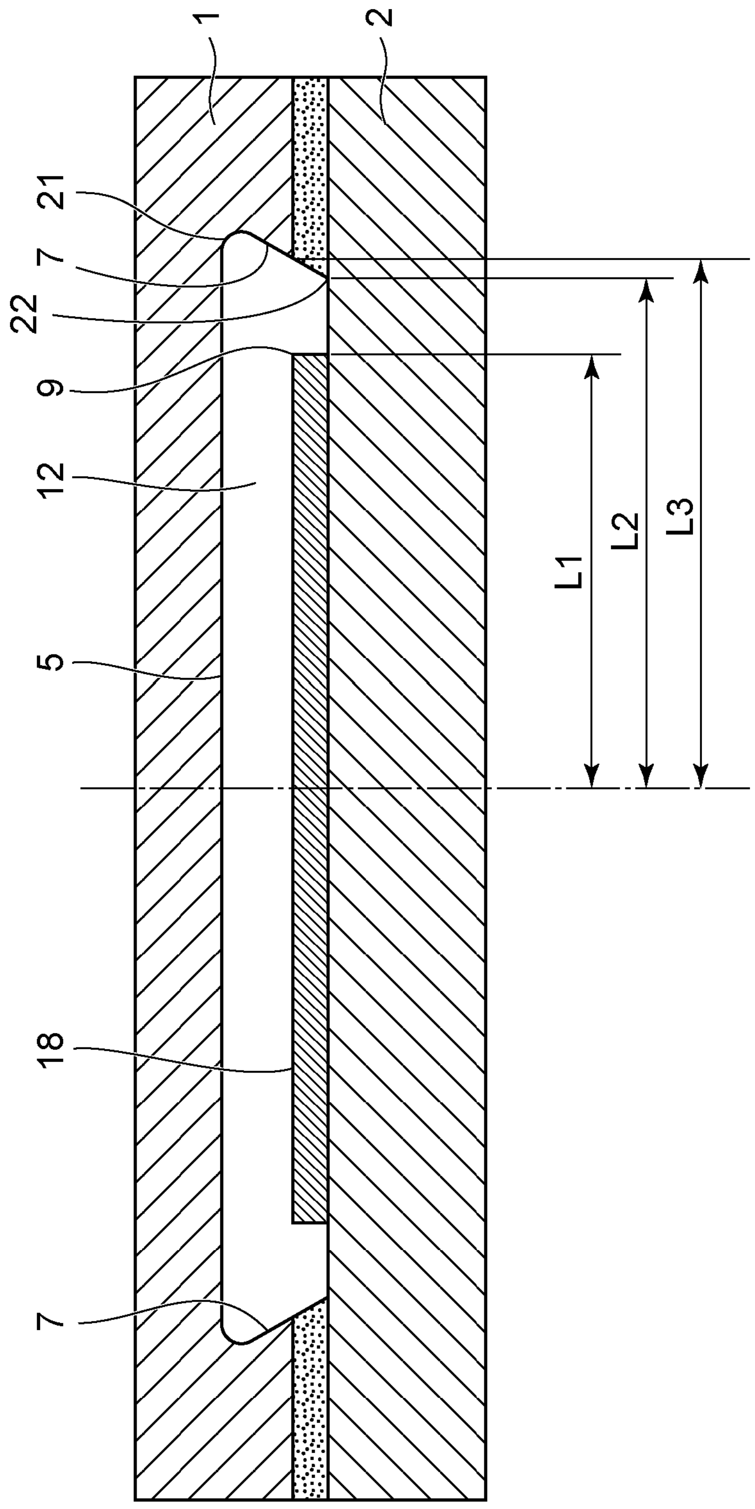
FIG. 8 is a sectional view of the liquid ejection head according to the first embodiment.

FIGS. 7 and 8 illustrate the positional relationship between the energy generating elements 18, the end portions 22 of the joint surfaces, and the end portion 21 of the bottom surface. FIG. 7 is a plan view illustrating the positional relationship. FIG. 8 is a schematic sectional view illustrating the positional relationship. In FIG. 8, the electrodes 6 are not illustrated. Here, L1, L2, and L3 are defined as follows:

L1: Distance (in the long side direction) from the middle E of the energy generating element 18 to the end portion 9 including the electrode of the energy generating element 18, L2: Distance (in the long side direction) from the middle E of the energy generating element 18 to the end portion 22 of the joint surface, and L3: Distance (in the long side direction) from the middle E of the energy generating element 18 to the end portion 21 (optically flat portion of the bottom surface) of the bottom surface.

In this case, the following relationship holds in the present disclosure:

$$L1 \leq L2 \leq L3.$$

In addition, L1', L2', and L3' are defined as follows:

L1': Distance (in the short side direction) from the middle E' of the energy generating element 18 to the end including the electrode of the energy generating element 18, L2': Distance (in the short side direction) from the middle E' of the energy generating element 18 to the end portion of the joint surface, and L3': Distance (in the short side direction) from the middle E' of the energy generating element 18 to the end of the optically flat portion of the bottom surface of the recessed portion.

In this case, the following relationship holds in the present disclosure:

L1'≤L2'≤L3'.

Figure 9:
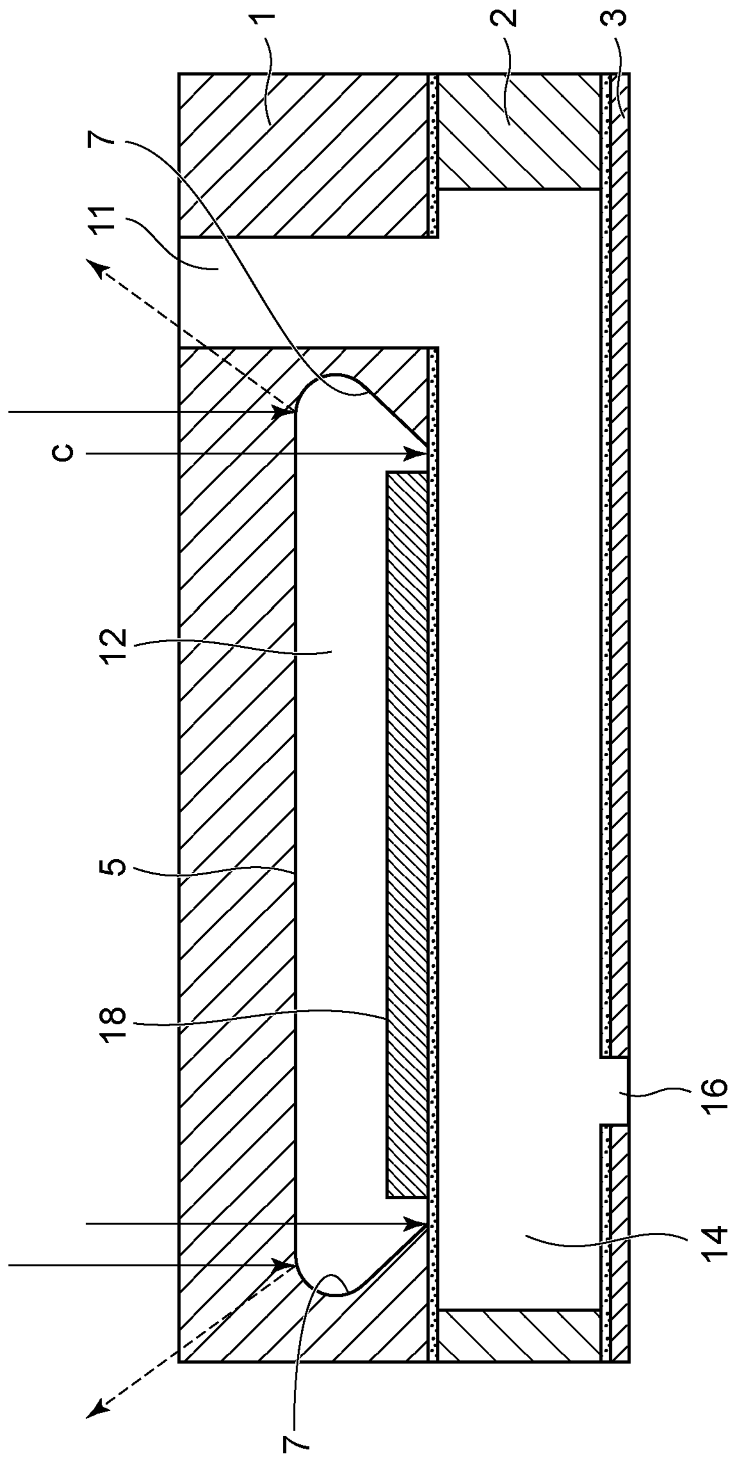
FIG. 9 is a sectional view of the liquid ejection head according to the first embodiment.

FIG. 9 illustrates the scattering of light in the direction of irradiation of near-infrared light by the inclination of the side surfaces of the recessed portion and the curved surface 8 of the bottom surface portion of the liquid ejection head. In FIG. 9, the electrodes 6 are not illustrated. In the case of observation from the upper surface of the first substrate by using a near-infrared light microscope, for example, the portion up to the end portion c of the bottom surface illustrated in FIG. 3 can be optically inspected due to the shape of the side edge portion of the bottom surface 5 of the recessed portion.

In the observation using a near-infrared light microscope under the conditions described above, the scattering of the light by the inclination of the side surfaces of the recessed portion and the curved surface 8 of the bottom surface portion does not interfere with the observation of the energy generating element. As a result, the connection portion between the energy generating element and the wiring, which is important for the liquid ejection head device, and the portion up to the end portion of the joint surface of an enclosed cavity, which has effects on the amplitude of vibration, can be inspected by using a near-infrared light microscope immediately after the flow path substrate is joined. Accordingly, appropriate feedback can be given to the manufacturing process even when an issue is found.

Second Embodiment

Figure 10:
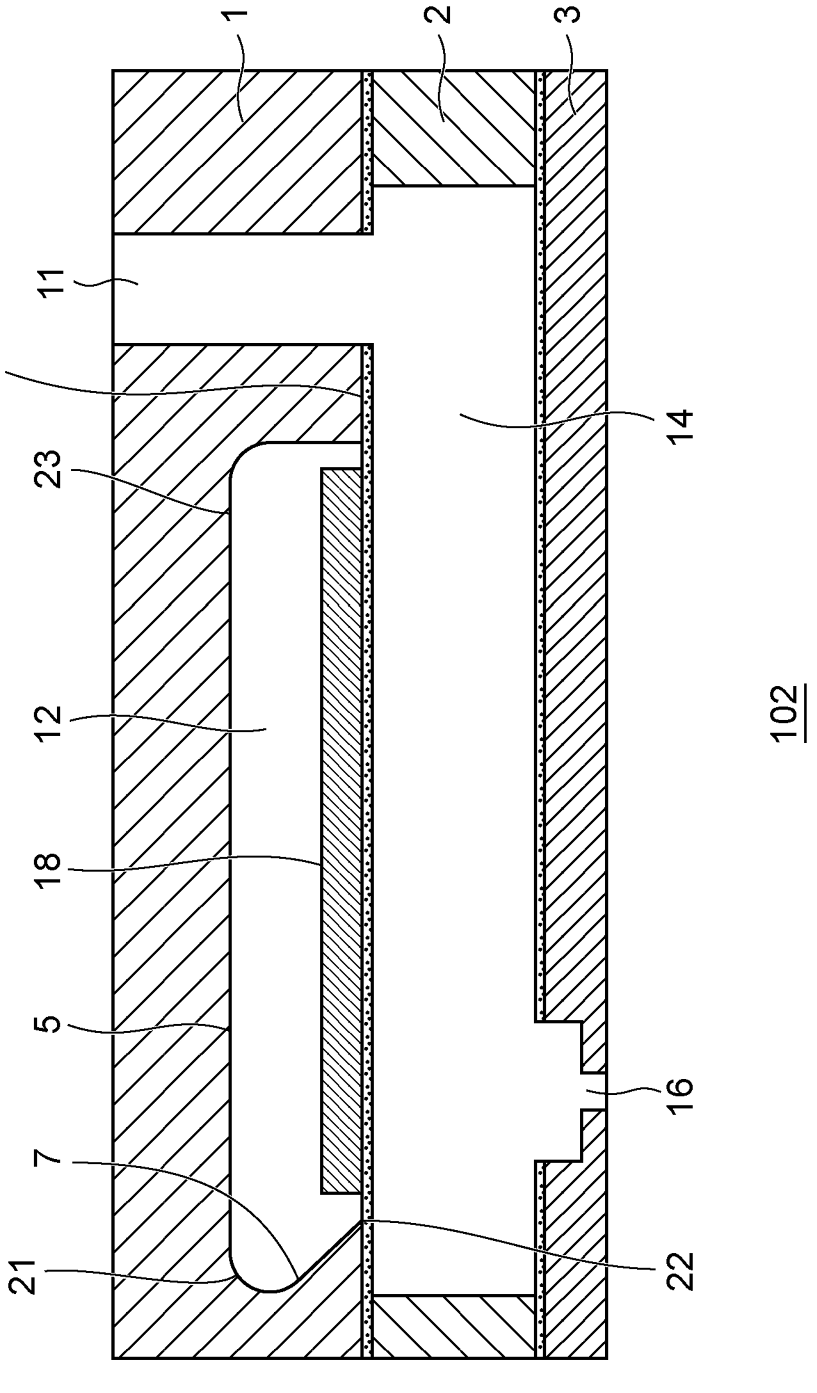
FIG. 10 is a sectional view of a liquid ejection head according to a second embodiment.

FIG. 10 is a sectional view of a liquid ejection head 102 according to a second embodiment. In FIG. 10, the electrodes 6 are not illustrated. As illustrated in FIG. 10, recessed portion 23 has side surfaces formed such that the opening increases toward the bottom surface of the recessed portion having been formed, from the surface of the first substrate 1 joined to the second substrate 2. In the embodiment, only one of the side surfaces of the recessed portion is inclined toward the outer circumference of the head relative to the bottom surface of the recessed portion. The other side surface is recessed vertically from the joint surface toward the bottom surface of the recessed portion, and the bottom surface of the recessed portion of the first substrate that has been formed extends from the side surface portion continuous with the surface joined to the second substrate 2 to the end portion 21 of the bottom surface via a curved surface having a certain curvature.

On the side on which the side surface is inclined, the outline of the opening on the joint surface of the first substrate 1 that joins the second substrate 2 matches the end portion 22 of the joint surface, and the end portion 22 of the joint surface is closer to the energy generating element 18 than is the end portion 21 of the bottom surface.

In the structure described above, when one of the end portions of the energy generating element 18 is observed by using a near-infrared light microscope, the scattering of light by the inclination of the side surfaces of the recessed portion and the curved surface of the bottom surface portion does not interfere with the observation (the inspection of the state in the recessed portion) of the energy generating element.

The embodiment is effective when, for example, an important device is mounted on one side of the energy generating element 18 and has the advantage of enabling easy formation of the recessed portion and easy design of a region in which light scattering is to be avoided.

Third Embodiment

Figure 11:
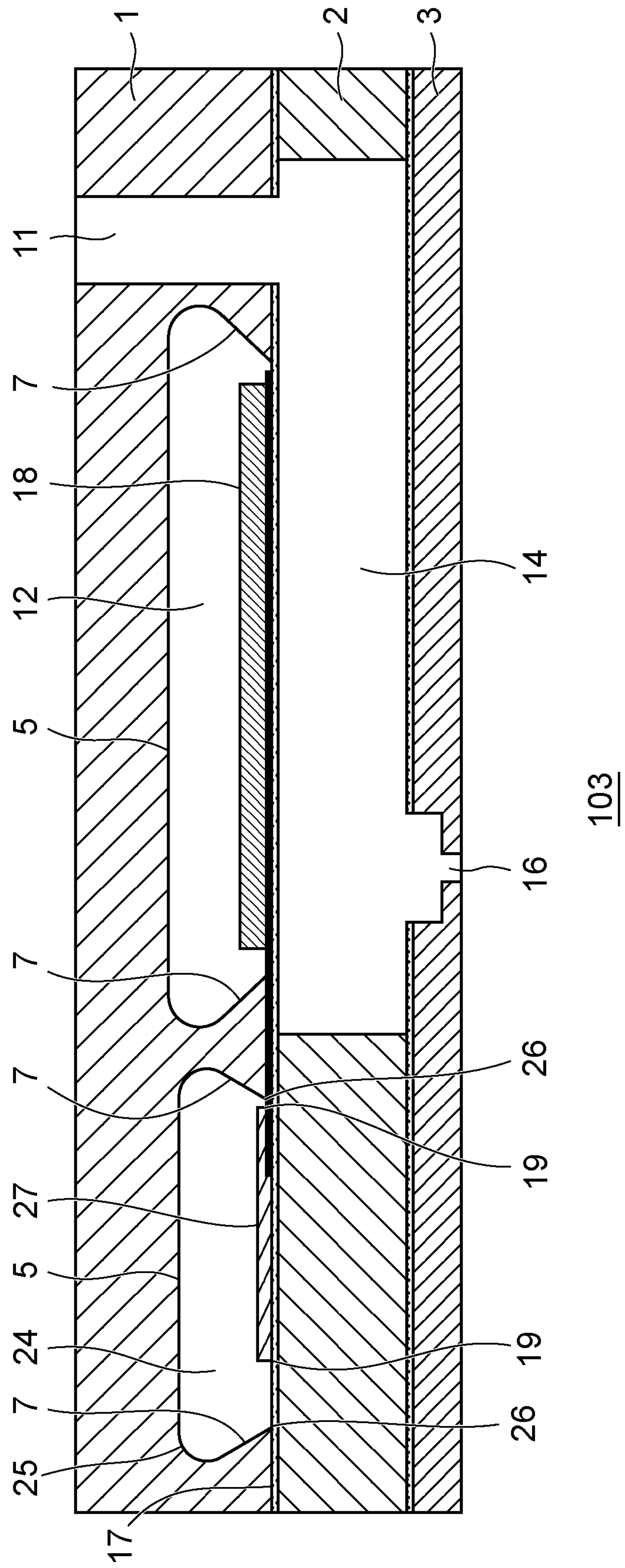
FIG. 11 is a sectional view of a liquid ejection head according to a third embodiment.

FIG. 11 is a sectional view of a liquid ejection head 103 according to a third embodiment. In FIG. 11, the electrodes 6 are not illustrated. In the embodiment, as illustrated in FIG. 11, the first substrate 1 has a second recessed portion 24 in which a terminal portion 27 electrically connected to the energy generating element 18 is housed. The second recessed portion 24 also has side surfaces inclined such that the opening increases toward the bottom surface of the recessed portion.

The bottom surface of the recessed portion that has been formed in the first substrate 1 extends from the side surface portion continuous with the surface joined to the second substrate 2 to an end portion 25 of the bottom surface via a curved surface having a certain curvature. The outline of the opening close to the joint surface of the first substrate 1 that joins the second substrate 2 matches an end portion 26 of the joint surface, and the end portion 26 of the joint surface is closer to the terminal portion 27 than is the end portion 25 of the bottom surface.

In observation using a near-infrared light microscope in accordance with the structure described above, it is possible to inhibit the scattering of light by the inclination of the side surface of the recessed portion and the curved surface of the bottom surface portion from interfering with the observation of the terminal.

According to the present disclosure, it is possible to provide a liquid ejection head in which the inside of the enclosed cavity (recessed portion) can be appropriately inspected by near-infrared light inspection.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-162136, filed Oct. 7, 2022, which is hereby incorporated by reference herein in its entirety.

What is claimed is:

1. A liquid ejection head comprising:

a first substrate having a recessed portion; and a second substrate joined with the first substrate, wherein an energy generating element configured to generate energy for ejecting liquid is housed in the recessed portion of the first substrate and is placed on a surface of the second substrate that faces the recessed portion, wherein an electrode that is electrically connected to the energy generating element is formed in an end portion of the energy generating element, wherein, among side surfaces of the recessed portion, a side surface of the recessed portion close to the electrode is inclined with respect to a joint surface between the first substrate and the second substrate, wherein the end portion of the energy generating element close to the electrode, an end portion of the joint surface close to the electrode, and an end portion of a bottom surface of the recessed portion close to the electrode are located in sequence from a middle of the energy generating element, wherein the electrode is formed in one end portion and an other end portion of the energy generating element in a longitudinal direction, wherein, among the side surfaces of the recessed portion, a side surface of the recessed portion close to the one end portion and a side surface of the recessed portion close to the other end portion are inclined in directions different from each other with respect to the joint surface, wherein, in a region between the middle of the energy generating element and the one end portion, an end portion of the energy generating element close to the one end portion, an end portion of the joint surface close to the one end portion, and an end portion of the bottom surface of the recessed portion close to the one end portion are located in sequence from the middle of the energy generating element, and wherein, in a region between the middle of the energy generating element and the other end portion, an end portion of the energy generating element close to the other end portion, an end portion of the joint surface close to the other end portion, and an end portion of the bottom surface of the recessed portion close to the other end portion are located in sequence from the middle of the energy generating element.

2. The liquid ejection head according to claim 1, wherein the side surface of the recessed portion close to the electrode is inclined in a transverse direction of the energy generating element.

3. The liquid ejection head according to claim 1, wherein the electrode is formed in at least one end portion of the energy generating element in a longitudinal direction.

4. The liquid ejection head according to claim 1, wherein the energy generating element is a heating element.

5. The liquid ejection head according to claim 1, wherein the energy generating element is a piezoelectric element.

6. A liquid ejection head comprising:

a first substrate having a recessed portion; and a second substrate joined with the first substrate, wherein an energy generating element configured to generate energy for ejecting liquid is housed in the recessed portion of the first substrate and is placed on a surface of the second substrate that faces the recessed portion, wherein an electrode that is electrically connected to the energy generating element is formed in an end portion of the energy generating element, wherein, among side surfaces of the recessed portion, a side surface of the recessed portion close to the electrode is inclined with respect to a joint surface between the first substrate and the second substrate, wherein the end portion of the energy generating element close to the electrode, an end portion of the joint surface close to the electrode, and an end portion of a bottom surface of the recessed portion close to the electrode are located in sequence from a middle of the energy generating element, and wherein the side surface of the recessed portion close to the electrode and the end portion of the bottom surface of the recessed portion close to the electrode are connected to each other via a curved surface.

* * * * *